(12) United States Patent
Yu et al.

(10) Patent No.: US 11,165,091 B2
(45) Date of Patent: Nov. 2, 2021

(54) BATTERY SYSTEM AND A METHOD OF FORMING A BATTERY

(71) Applicant: City University of Hong Kong, Kowloon (HK)

(72) Inventors: Yau Wai Denis Yu, Mid-Level (HK); Huimin Wang, Kowloon (HK)

(73) Assignee: City University of Hong Kong, Kowloon (HN)

( * ) Notice: Subject to any disclaimer, the term of this patent is extended or adjusted under 35 U.S.C. 154(b) by 0 days.

(21) Appl. No.: 15/877,460

(22) Filed: Jan. 23, 2018

(65) Prior Publication Data

US 2019/0229363 A1 Jul. 25, 2019

(51) Int. Cl.
*H01M 10/04* (2006.01)
*H01M 4/134* (2010.01)
*H01M 10/0563* (2010.01)

(52) U.S. Cl.
CPC ....... *H01M 10/0459* (2013.01); *H01M 4/134* (2013.01); *H01M 10/0563* (2013.01)

(58) Field of Classification Search
CPC ............. H01M 10/0459; H01M 4/134; H01M 10/0566
See application file for complete search history.

(56) References Cited

U.S. PATENT DOCUMENTS

| | | | |
|---|---|---|---|
| 5,211,827 A | 5/1993 | Peck | |
| 8,293,092 B2 | 10/2012 | Arzt et al. | |
| 8,592,092 B2 | 11/2013 | Suto | |
| 9,786,944 B2 | 10/2017 | Chiang | |
| 2007/0059587 A1* | 3/2007 | Kishi | H01M 10/0568 429/62 |
| 2010/0085684 A1* | 4/2010 | Suh | H01G 11/42 361/503 |
| 2013/0183546 A1* | 7/2013 | Joshi | H01M 6/185 429/50 |
| 2014/0062412 A1* | 3/2014 | Bartling | H01M 10/3918 320/134 |
| 2014/0170507 A1* | 6/2014 | Matsui | H01M 6/162 429/338 |
| 2015/0001943 A1* | 1/2015 | Bartling | H02J 9/061 307/65 |
| 2016/0285128 A1* | 9/2016 | Matsui | H01M 4/382 |
| 2017/0194106 A1* | 7/2017 | Majima | H01G 9/0425 |
| 2019/0198929 A1* | 6/2019 | Chiang | H01M 10/0569 |

OTHER PUBLICATIONS

Zhang, R., et al. A conceptual magnesium battery with ultrahigh rate capability. Chemical Communications. 51, 1487-1490 (2015).
La Mantia, F., et al. Batteries for efficient energy extraction from a water salinity difference. Nano letters. 11, 1810-1813 (2011).

* cited by examiner

*Primary Examiner* — Matthew J Merkling
(74) *Attorney, Agent, or Firm* — Renner Kenner Greive Bobak Taylor & Weber (57) ABSTRACT

A battery system includes a positive electrode having a first material arranged to undergo chemical reaction during charging and/or discharging of the battery, a negative electrode having a second material arranged to undergo chemical reaction during charging and/or discharging of the battery, a separator disposed between the positive electrode and the negative electrode; and an electrolyte having a charge carrier, wherein the charge carrier is arranged to facilitate the chemical reaction of the first material during charging and/or discharging of the battery.

19 Claims, 9 Drawing Sheets

BATTERY SYSTEM AND A METHOD OF FORMING A BATTERY

TECHNICAL FIELD

The present invention relates to a battery system and a method of forming a battery, although not exclusively, to a battery system and a method of forming a battery having an electrolyte with a charge carrier for facilitating the chemical reaction of the electrode material.

BACKGROUND

Batteries have been widely used in many applications ranging from cell phone, electric vehicles (EV) to large stationary storage. The battery market was valued at USD 23.51 Billion in 2015 and is expected to grow at a compound annual growth rate (CAGR) of 16.6% between 2016 and 2022. The increasing demand of energy-efficient, safe, and low-cost batteries is the key factor driving the growth of the battery market.

Despite that, to meet future applications needs, increasing the cell energy density further is still a pressing goal for battery research. For example, the Vehicle Technologies Office of the US Department of Energy has set a target of 350 W h kg$^{-1}$ for EV applications. However, the main issue is how to achieve such a goal. Technical problems such as cycle stability, large polarization, limited rate performance, and occurrence of side reactions still remain to be solved in the research and development sector of the battery technology.

SUMMARY OF THE INVENTION

To solve or reduce at least some of the above problems, the present invention discloses a battery system comprising a positive electrode, a negative electrode, a separator disposed between the positive electrode and the negative electrode, and an electrolyte having a charge carrier such as chloride ion (Cl$^-$) for facilitating the chemical reaction of the electrode material during charging and/or discharging of the battery.

In accordance with a first aspect of the present invention, there is provided a battery system (100) comprising: a positive electrode (110) having a first material (130) arranged to undergo chemical reaction during charging and/or discharging of the battery 100; a negative electrode (120) having a second material (140) arranged to undergo chemical reaction during charging and/or discharging of the battery (100); a separator (200) disposed between the positive electrode (110) and the negative electrode (120); and an electrolyte (300) having a charge carrier (310), wherein the charge carrier (310) is arranged to facilitate the chemical reaction of the first material (130) during charging and/or discharging of the battery (100).

In an embodiment of the first aspect, the charge carrier (310) is arranged to undergo chemical reaction with the first material (130) to provide a plurality of electrons.

In an embodiment of the first aspect, the charge carrier (310) is arranged to undergo chemical reaction with the first material (130) to form an insoluble substance (132) and provide a plurality of electrons.

In an embodiment of the first aspect, the insoluble substance (130) comprises metal chloride or metal.

In an embodiment of the first aspect, the charge carrier (310) is arranged to facilitate the dissolution of the first material (130) to provide a plurality of metal ions and a plurality of electrons.

In an embodiment of the first aspect, the charge carrier (310) comprises a plurality of non-metal ion.

In an embodiment of the first aspect, the non-metal ion includes at least one of Cl$^-$, PF$_6^-$, BF$_4^-$, ClO$_4^-$ and TFSI$^-$.

In an embodiment of the first aspect, the charge carrier (310) comprises a plurality of metal ion.

In an embodiment of the first aspect, the metal ion includes at least one of Li$^+$, Na$^+$ and K$^+$.

In an embodiment of the first aspect, the electrolyte (300) includes at least one of an organic solvent and an ionic liquid.

In an embodiment of the first aspect, the organic solvent includes at least one of diethyl carbonate, ethylene carbonate, ethylmethyl carbonate, propylene carbonate, dimethoxyethane (DME) and dimethyl sulfoxide (DMSO).

In an embodiment of the first aspect, the ionic liquid comprises a Cl-based electrolyte.

In an embodiment of the first aspect, the Cl-based electrolyte includes at least one of 1-Methyl-3-Octylimidazolium chloride ([OMIM][Cl]) and 1-Butyl-3-methylimidazolium chloride ([BMIM]Cl).

In an embodiment of the first aspect, the stored capacity of the positive electrode (110) is inversely proportional to the size of the particle in the first material (130).

In an embodiment of the first aspect, the first material (130) includes at least one of an element, alloy form of an element, a metal chloride, a metal oxide, a metal oxychloride, and a metal sulphide.

In an embodiment of the first aspect, the element includes at least one of Al, Ti, V, Cr, Mn, Fe, Co, Ni, Cu, Zn, Y, Zr, Nb, Mo, Tc, Ru, Ph, Pd, Ag, Cd, Hf, Ta, W, Re, Os, Ir, Pt, Au, In, Sn, Sb, Pb and Bi.

In an embodiment of the first aspect, the alloy includes at least one of steel and stainless steel.

In an embodiment of the first aspect, the metal chloride includes at least one of CuCl, AgCl and PbCl$_2$.

In an embodiment of the first aspect, the metal oxide includes at least one of CuO, AgO, and PbO.

In an embodiment of the first aspect, the metal oxychloride includes at least one of bismuth oxychloride (BiOCl) and vanadium oxychloride (VOCl).

In an embodiment of the first aspect, the metal sulphide includes at least one of molybdenum disulfide (MoS$_2$), antimony trisulfide (Sb$_2$S$_3$), and bismuth trisulfide (Bi$_2$S$_3$).

In an embodiment of the first aspect, the second material (140) comprises an alkali metal.

In an embodiment of the first aspect, the alkali metal includes at least one of Li, Na and K.

In an embodiment of the first aspect, the second material (140) is adapted to provide alkali metal ions.

In an embodiment of the first aspect, the second material (140) includes at least one of graphite, hard carbon, silicon, tin, antimony, bismuth, lead, zinc, and lithium titanate.

In an embodiment of the first aspect, the separator (200) is arranged to reduce shuttling effect.

In an embodiment of the first aspect, the separator (200) comprises an anion exchange membrane.

In an embodiment of the first aspect, the battery (100) comprises an expected voltage between 2.5 V and 3 V and an energy density between 500 Wh kg$^{-1}$ and 700 Wh kg$^{-1}$.

In accordance with a second aspect of the present invention, there is provided a method of forming a battery (100) comprising the steps of: forming a positive electrode (110) with a first material (130), wherein the first material (130) is arranged to undergo chemical reaction during charging and/or discharging of the battery (100); forming a negative electrode (120) with a second material (140), wherein the second material (140) is arranged to undergo chemical reaction during charging and/or discharging of the battery (100); forming a separator (200) between the positive electrode (110) and the negative electrode (120); and pretreating an electrolyte (300) to include charge carrier (310), wherein the charge carrier (310) is arranged to facilitate the chemical reaction of the first material (130).

BRIEF DESCRIPTION OF THE DRAWINGS

Embodiments of the present invention will now be described, by way of example, with reference to the accompanying drawings in which:

FIG. 4b is a plot showing the charge-discharge profiles of Ag-CNT of FIG. 4a;

FIG. 5b is a plot showing the cycle performance of CuCl@C of FIG. 5a;

DETAILED DESCRIPTION OF THE PREFERRED EMBODIMENT

The inventors have, through their own research, trials and experiments, devised that energy density of existing battery technologies, in particular lithium-ion technologies is limited to only about practical energy density of 250 W h kg⁻¹ on the battery level. One of the main obstacles to higher energy density of Lithium-ion batteries (LIBs) is the limited amount of lithium ions that the cathode can hold.

For instance, LIBs typically use cathode materials such as $LiCoO_2$, $LiNi_{0.8}Co_{0.1}Al_{0.1}O_2$, $LiMn_2O_4$, $LiNi_{0.5}Mn_{1.5}O_4$ to store the energy. Traditionally, the cathode material need to contain lithium as there are no other sources of ions in the battery for energy storage. Because of the limited amount of lithium that can be extracted and inserted into the cathode material, the theoretical energy density of these batteries is only below 576 W h kg⁻¹.

In the present invention, the inventors devised a novel battery system using chloride ions to assist electron transfer during charge and discharge. Depending on the type of electrode materials, energy is stored through the formation of insoluble metal chlorides or through controlled release of metal ions into the electrolyte, which can be reversed upon discharging. This enables a large capacity from the metal electrode. To increase voltage and energy density of the battery, the metal cathode can be coupled with an alkali metal using organic solvent as the electrolyte.

Figure 1:
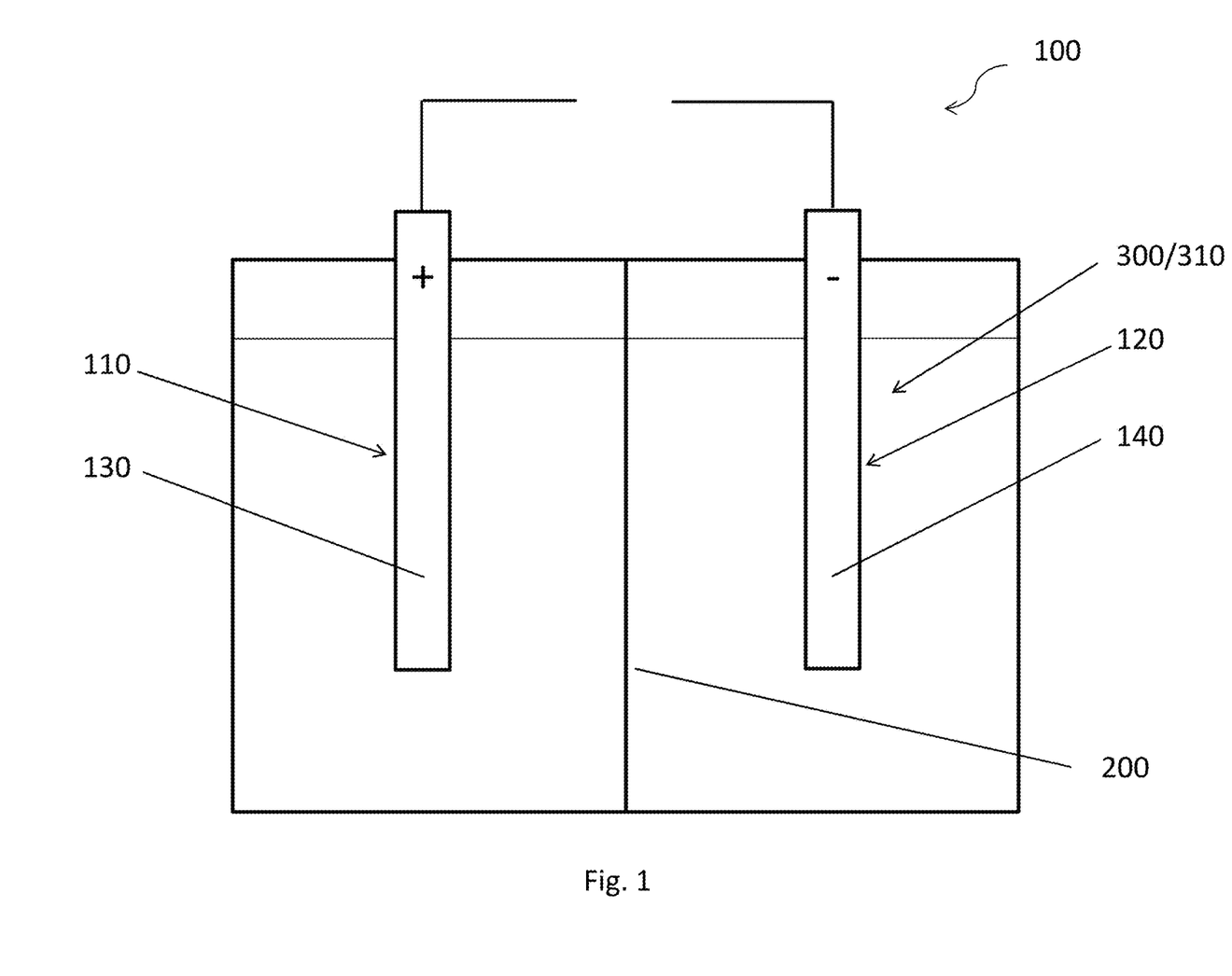
FIG. 1 is a schematic diagram showing the electrochemical arrangement of a battery system in accordance with one embodiment of the present invention.

With reference initially to FIG. 1, there is shown an embodiment of a battery system 100 comprising: a positive electrode 110 having a first material 130 arranged to undergo chemical reaction during charging and/or discharging of the battery 100; a negative electrode 120 having a second material 140 arranged to undergo chemical reaction during charging and/or discharging of the battery 100; a separator 200 disposed between the positive electrode 110 and the negative electrode 120; and an electrolyte 300 having a charge carrier 310, wherein the charge carrier 310 is arranged to facilitate the chemical reaction of the first material 130 during charging and/or discharging of the battery 100.

In this embodiment, the battery system 100 includes a cathode 110, an anode 120, and a separator 200 disposed therebetween for separating the cathode 110 and the anode 120. Preferably, each of the cathode 110 and the anode 120 may be formed from different materials and undergo reversible chemical reactions within the electrolyte 300 during charging and discharging respectively.

Referring to Table 1 below, the potential, capacity and energy density provided by the cathode materials 130 of the present invention is compared to other conventional cathode materials. In addition, with the usage of alkali metal as the counter electrode 120, the present invention may give a much higher energy density than other conventional cathode materials.

TABLE 1

| Cathode | Potential (V vs. Li/Li⁺) | Capacity (mAh g⁻¹) | Energy density (Wh kg⁻¹) |
|---|---|---|---|
| $LiCoO_2$ | 3.7 | ~150 | 555 |
| $LiMn_2O_4$ | 4.0 | ~100 | 400 |
| $LiNi_{0.5}Mn_{1.5}O_4$ | 4.8 | ~120 | 576 |
| M/M⁺Cl⁻ | ~2.8 | 248 (e.g. Ag) | 694 |
| M/M²⁺Cl²⁻ | ~2.5 | 959 (e.g. Fe) | 2397 |

Preferably, the present invention may use any metal as the material 130 of cathode 110 without worrying about the source of the ions. The advantageous of such arrangement in that, the cathode 110 may provide a much higher capacity than conventional LIBs. For instance, the theoretical capacities of Ag and Fe as the electrode material 130 are 248 mAh g⁻¹ and 959 mAh g⁻¹ respectively, which is much higher than the theoretical capacities of existing LIB cathode materials ranging from 100 mAh g⁻¹ to 200 mAh g⁻¹.

Without limited by the following examples, the first material 130 may include one or more elements such as Al, Ti, V, Cr, Mn, Fe, Co, Ni, Cu, Zn, Y, Zr, Nb, Mo, Tc, Ru, Ph, Pd, Ag, Cd, Hf, Ta, W, Re, Os, Ir, Pt, Au, In, Sn, Sb, Pb and Bi, or one or more alloy form of an element such as steel and stainless steel.

Alternatively and without limited by the following examples, the first material 130 may include one or more metal chlorides such as CuCl, AgCl and PbCl$_2$, one or more metal oxides such as CuO, Ago and PbO, one or more metal oxychlorides such as bismuth oxychloride (BiOCl) and vanadium oxychloride (VOCl), or one or more metal sulphides such as molybdenum disulfide (MoS$_2$), antimony trisulfide (Sb$_2$S$_3$) and bismuth trisulfide (Bi$_2$S$_3$).

Furthermore, the cathode 110 may be coupled with an alkali-metal anode 120. The use of an alkali metal as the second material 140 may provide a much higher cell voltage. For instance, such battery may give a voltage of 2.5-3 V and a high energy density of 700 Wh kg$^{-1}$ or above.

Without limited by the following examples, the second material 140 may include an alkali metal such as Li, Na and K or any other material that is adapted to provide alkali metal ions such as graphite, hard carbon, silicon, tin, antimony, bismuth, lead, zinc, and lithium titanate.

The electrolyte 300 is pre-treated to include charge carrier 310 for facilitating the chemical reaction of the first material 130 i.e. oxidation and reduction during charging and discharging process of the battery 100, thereby providing outstanding energy density. Preferably, the charge carrier 310 may include a plurality of non-metal ions, and more preferably include a plurality of chloride ions (Cl$^-$).

Without limited by the following examples, the charge carrier 310 may include one or more non-metal ion such as PF$_6^-$, BF$_4^-$, ClO$_4^-$ and TFSI$^-$ or one or more metal ion such as Li$^+$, Na$^+$ and K$^+$.

Alternatively and without limited by the following examples, the electrolyte 300 may include one or more organic solvents such as diethyl carbonate, ethylene carbonate, ethylmethyl carbonate, propylene carbonate, dimethoxyethane (DME) and dimethyl sulfoxide (DMSO) or one or more ionic liquids, for instance Cl-based electrolyte such as 1-Methyl-3-Octylimidazolium chloride ([OMIM][Cl]) and 1-Butyl-3-methylimidazolium chloride ([BMIM]Cl).

Figure 2A:
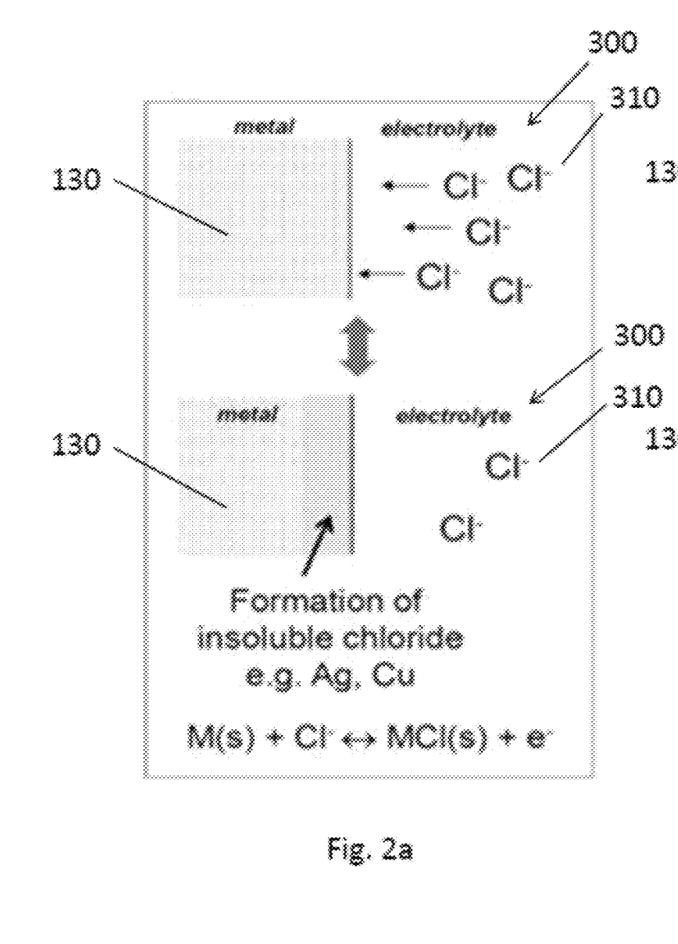
FIG. 2a is an illustration of a first reaction mechanism associated with Cl⁻ ions at the cathode in accordance with one embodiment of the present invention.
Figure 2B:
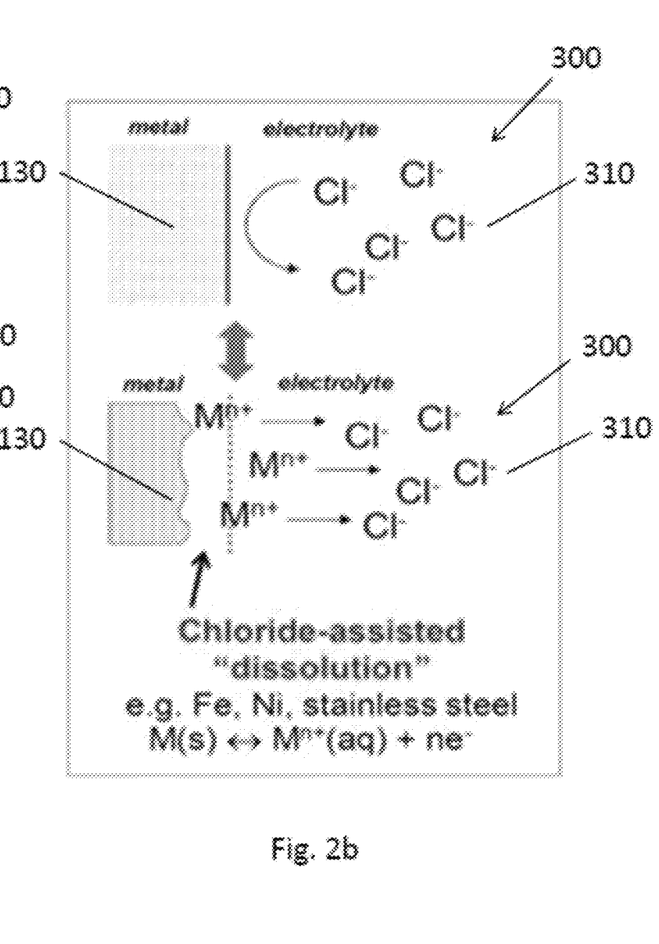
FIG. 2b is an illustration of a second reaction mechanism associated with Cl⁻ ions at the cathode in accordance with one embodiment of the present invention.

Referring to FIGS. 2a to 2b for the detailed description of the chemical reaction at the cathode 110, the charge carrier 310 e.g. chloride ions (Cl$^-$) in the electrolyte 300 is arranged to undergo chemical reaction with the first material 130 e.g. metal directly to form an insoluble substance e.g. metal chloride and a plurality of electrons, as shown in FIG. 2a and the electrochemical reaction given by Eq. 1 below:

(Eq. 1)

However, in some occasions, the charge carrier 310 may not undergo chemical reaction with the first material 130 directly. Alternatively, the plurality of chloride ions 310 may facilitate the dissolution of the first material 130 e.g. metal, without reacting directly with the first material 130, to provide a plurality of metal ions and a plurality of electrons. As shown in FIG. 2b and the electrochemical reaction given by Eq. 2 below, the metal ions may be dissolved in the electrolyte 300.

(Eq. 2)

In one example embodiment, the battery system 100 is a reversible Cl-based battery 100 that can operate at room temperature with higher voltage. This is possible by combining Ag/AgCl reaction on the cathode side 110 with Li metal as the anode 120, using an organic electrolyte 300 with larger voltage stability window. Preferably, the electrolyte 300 contains a plurality of Cl$^-$. The electrochemical reaction on the cathode side 110 is given by Eq. 3 below (Eq. 3)

which has a theoretical capacity of 248 mAh g$^{-1}$ with one electrode transfer.

Figure 2C:
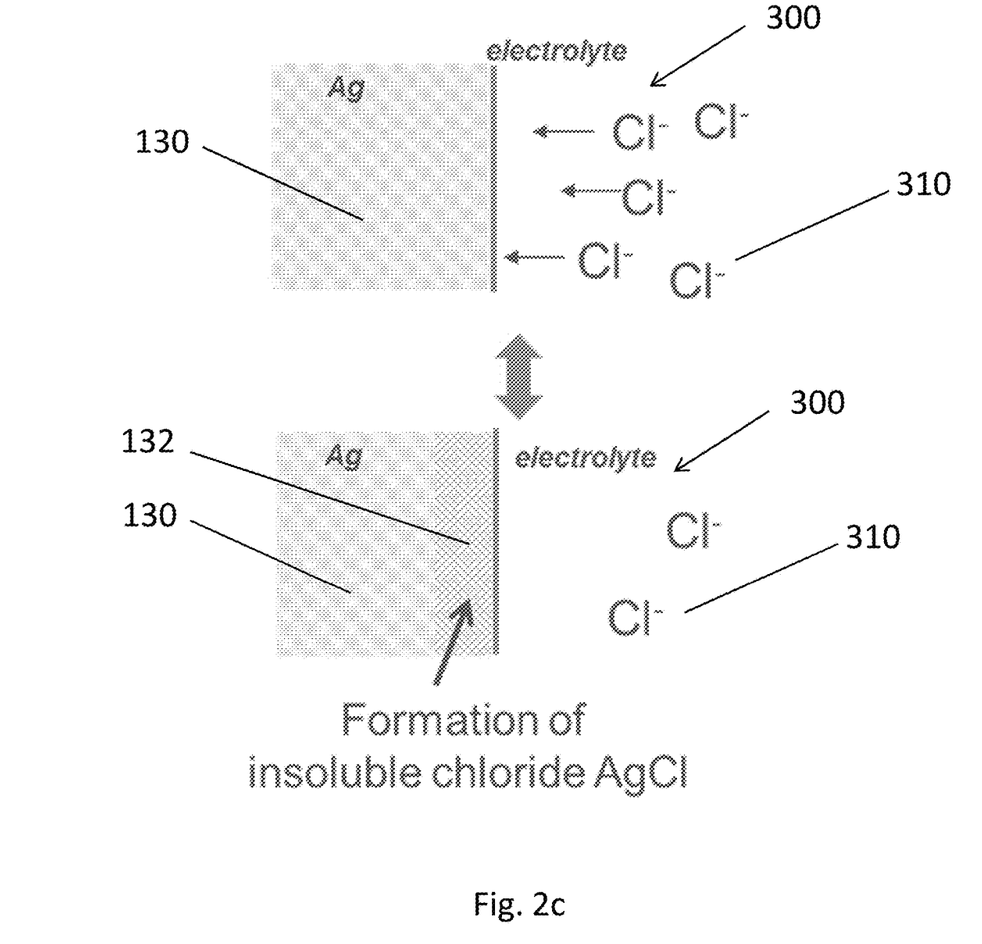
FIG. 2c is an illustration of a reaction mechanism between the Cl⁻ ions and the Ag cathode in accordance with one embodiment of the present invention.

Specifically, the Ag electrode can reversibly capture and release chloride ions during charge and discharge. During charging process as shown in FIG. 2c, metallic Ag 130 gives out an electron and captures Cl$^-$ from the electrolyte 300 to form AgCl. On the other hand, during discharging process, AgCl will decompose and release Cl$^-$ into the electrolyte 300. As the removal of Cl$^-$ is facile, Ag/AgCl may exhibit excellent discharge rate capability. Hence, energy can be stored with the reversible formation/decomposition of AgCl on cathode 110.

Advantageously, lithium metal may be used as the counter electrode 120 to obtain a high voltage of about 2.8 V with an energy density of 694 Wh kg$^{-1}$, as shown in Table 1 above. This is higher than the energy density of about 555 Wh kg$^{-1}$ for LiCoO$_2$ with a typical capacity of 150 mAh g$^{-1}$ at 3.7 V.

The inventors have also devised that the stored capacity of the positive electrode 110 is inversely proportional to the size of the particle in the electrode material 130. In particular, the capacity of the electrode 110 increases with decreasing particle size, which is attributed to the formation of insoluble and insulated AgCl on the surface of the particle. For instance, a capacity of close to 200 mAh g$^{-1}$ with a potential of 2.8 V vs. Li/Li$^+$ can be achieved with nano-Ag supported by Ag-carbon nanotube (Ag-CNT).

Figure 3:
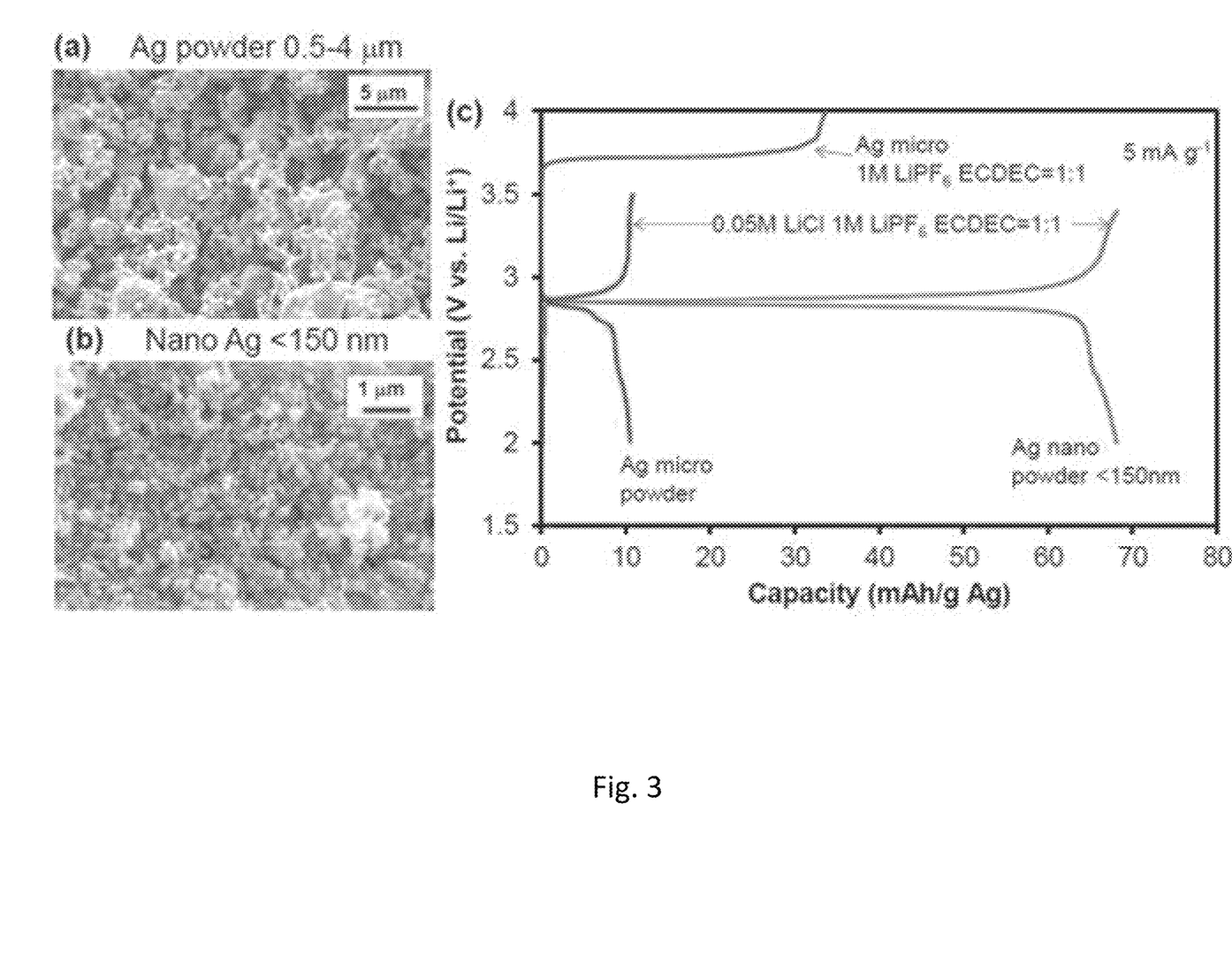
FIG. 3 provides, at part (a), a SEM image of Ag powder with particle size about 0.5-4 μm (m-Ag); at part (b), a SEM image of Ag powder with nano size less than 150 nm (n-Ag); and, at part (c), a plot showing the charge-discharge performance of the Ag powders of FIGS. 3a and 3b.

In one example embodiment of the battery system 100, the positive electrode 110 may be fabricated by a variety of commercial Ag powders with different particle sizes, for example, one with particle size about 0.5-4 μm (m-Ag) as shown in FIG. 3a and another with nano size less than 150 nm (n-Ag) as shown in FIG. 3b. The positive electrode 110 may be made into pouch cells together with a negative, counter electrode 120 fabricated by Li metal and an electrolyte 300 of 0.05M LiCl 1M LiPF$_6$ EC/DEC=1:1.

Illustratively, the charge-discharge performances of the m-Ag and n-Ag are presented in FIG. 3c, showing that m-Ag and n-Ag can give capacities of about 10 mAh g$^{-1}$ and 70 mAh g$^{-1}$, respectively, with a potential of about 2.8 V vs. Li/Li$^+$. The voltage plateau at 2.8 V is caused by the reaction with Cl$^-$ in the electrolyte 300.

In another example embodiment of the battery system 100, the cathode 110 may be made of Ag-carbon nanotube (Ag-CNT). For instance, the Ag-CNT composites may be synthesized by the following steps:

Step 1: CNT is first dispersed into the solution of AgNO$_3$, with polyethylene glycol (PEG) 20000 dissolved in it as surfactant.

Step 2: The dispersion is sonicated for 30 mins and then sodium hydroxide solution was added dropwise into the dispersion under stirring.

Step 3: The mixture (AgOH-CNT) is then centrifuged and washed with DI water and ethanol for three times.

Step 4: The precipitation is dried at 60° C. and then heat-treated subsequently at 300° C. for 3 hours to decompose the AgOH-CNT into Ag-CNT.

For instance, four Ag-CNTs with different ingredients and different Ag to CNT mass ratios (denoted as r) are shown in Table 2. These Ag-CNTs are made into positive electrodes 110 in pouch cells with Li metal as the counter electrodes 120 and tested with 0.05M LiCl 1M LiPF$_6$ EC/DEC=1:1 as the electrolyte 300.

TABLE 2

| Composite material | Mass ratio (Ag to CNT) | Mass of CNT | Volume and concentration of AgNO$_3$ (aq) | Volume and concentration of NaOH | Concentration of PEG20000 |
|---|---|---|---|---|---|
| Ag-CNT-1 | 1.59 | 0.3386 g | 100 ml 0.05M | 100 ml 0.05M | $2.5 \times 10^{-4}$M |
| Ag-CNT-2 | 1 | 0.1078 g | 50 ml 0.02M | 50 ml 0.02M | $2.5 \times 10^{-4}$M |
| Ag-CNT-3 | 0.5 | 0.2158 g | 50 ml 0.02M | 50 ml 0.02M | $2.5 \times 10^{-4}$M |
| Ag-CNT-4 | 0.25 | 0.2157 g | 25 ml 0.02M | 30 ml 0.02M | $2.5 \times 10^{-4}$M |

Figure 4A:
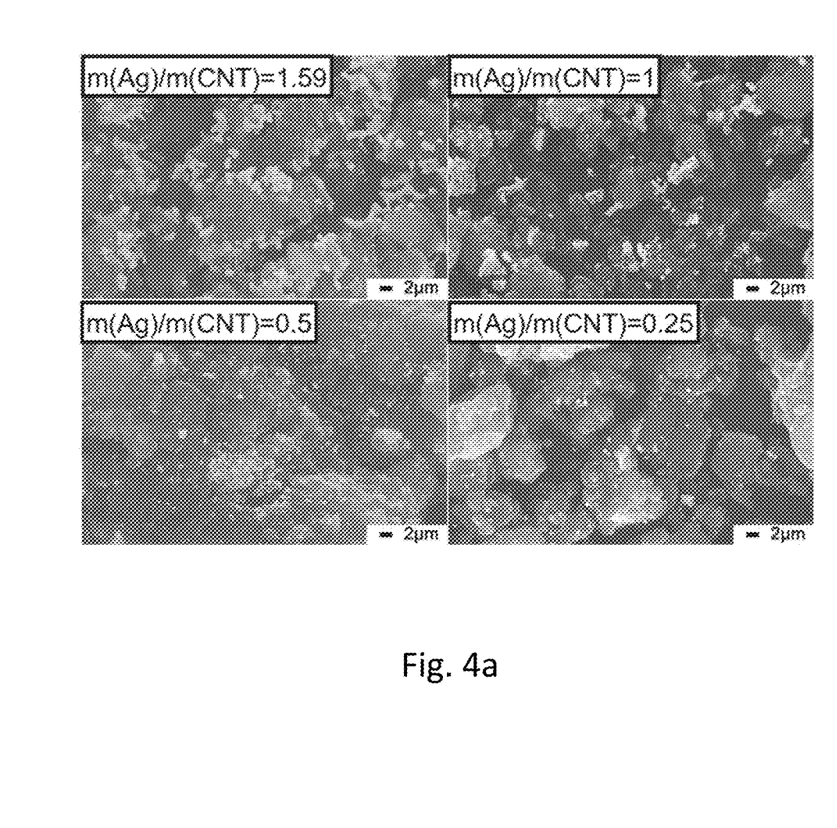
FIG. 4a are the SEM images of Ag-CNT with Ag to CNT mass ratio ranging from 0.25 to 1.59.
Figure 4B:
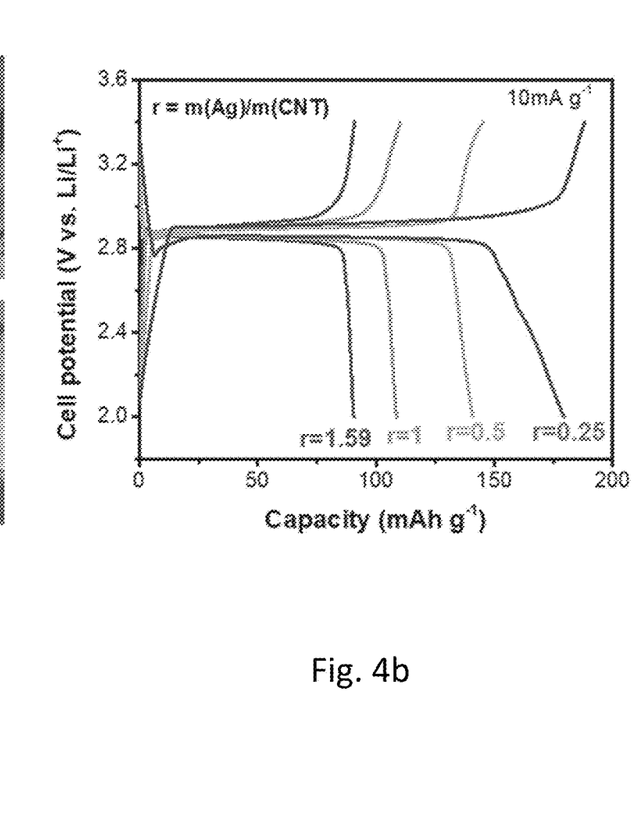

Referring to FIGS. 4a to 4b for the SEM images and charging and discharging curves of the Ag-CNT with four different mass ratios (r), Ag-CNT with a mass ratio of Ag to CNT of 0.25 may obtain a discharge capacity of 170 mAh g$^{-1}$.

Figure 5A:
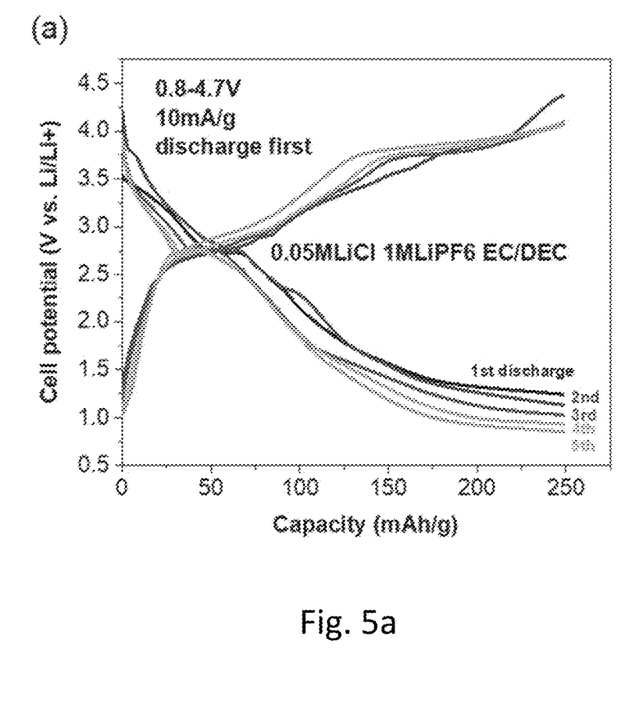
FIG. 5a is a plot showing the charge-discharge profiles of CuCl@C at 10 mA g⁻¹ (capacity cut-off at 250 mA h g⁻¹)
Figure 5B:
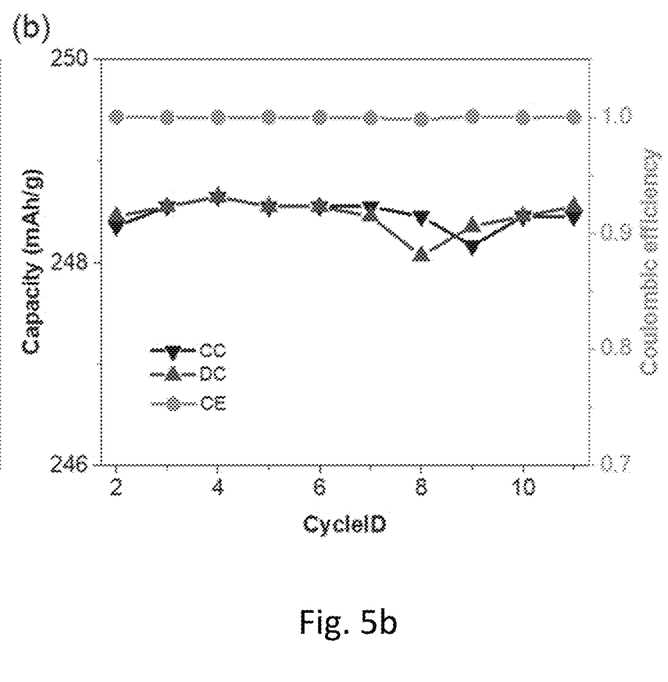

In another example embodiment of the battery system 100, the cathode 110 may be made of CuCl with carbon (CuCl@C). For instance, CuCl@C may be prepared by ball milling CuCl with acetylene black and in turn, the prepared CuCl@C material may be made into electrodes 110 with PTFE as binder. Similarly, 0.05M LiCl 1M LiPF6 EC/DEC is used as the electrolyte 300 and Li metal is used as the counter electrode 120. The cell is cut off at a capacity of 250 mAh g$^{-1}$. As shown in FIGS. 5a to 5b, the battery system 100 may deliver excellent voltage profiles and cycle performance during multiple charging and discharging cycles. The battery system 100 may provide a reversible capacity.

Figure 6:
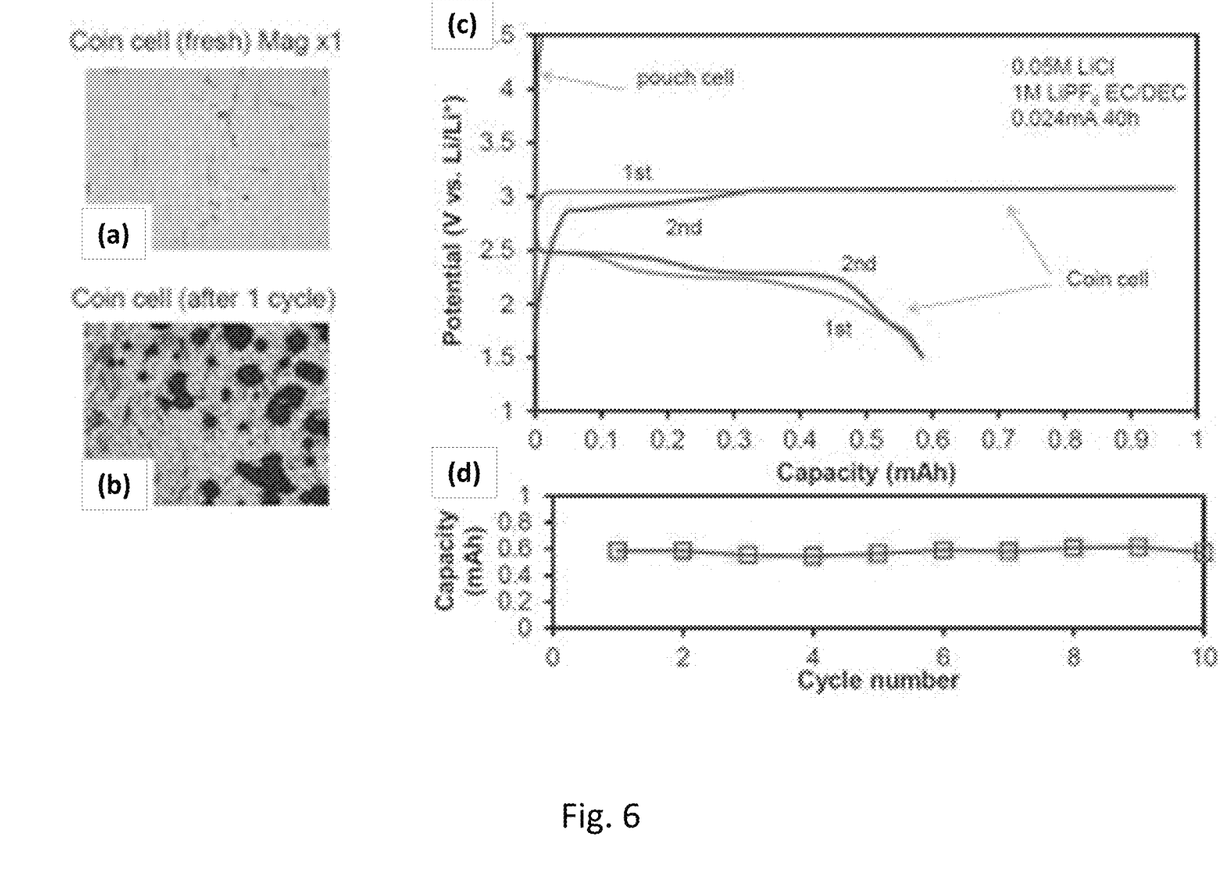
FIG. 6 provides, at part (a), a SEM image of a fresh coin cell made of stainless steel 304; at part (b), a SEM image of the coin cell of part (a) after one charging and discharging cycle; at part (c), a plot showing the charge-discharge curves of the coin cell of FIG. 6a with LiCl-containing electrolyte (capacity cut-off at 0.96 mAh); and, at part (d) a plot showing the cycle performance of the coin cell of FIG. 6a with LiCl-containing electrolyte (capacity cut-off at 0.96 mAh)

In another example embodiment of the battery system 100, the cathode 110 may be made of stainless steel. For instance, stainless steel such as SUS304 coin cell as shown in FIGS. 6a to 6b may be assembled with Li foil as the two electrodes 110, 120 with 0.05M LiCl 1M LiPF$_6$ EC/DEC electrolytes 300. As shown in FIGS. 6c to 6d, SUS304 cell shows a constant charge plateau at ~3.1 V and a reversible capacity at around 2.5V during discharge respectively.

Optionally, the separator 200 may be provided as an anion exchange membrane (AEM) to reduce shuttling effect. Specifically, the anion exchange membrane may be a semipermeable membrane 200 generally made from ionomers and designed to conduct anions while being impermeable to gases such as oxygen or hydrogen. Advantageously, the anion exchange membrane 200 may separate the reactants and transport the anions.

In another example embodiment of the battery system 100, Cu may be used as cathode material 130 in pouch cells with 0.05M LiCl 1MLiPF$_6$ FEC/DEC as electrolyte 300 and Li as counter electrode 120. Preferably, the anion exchange membrane 200 may serve as barriers to block the passage of soluble Cu$^{2+}$.

Figure 7A:
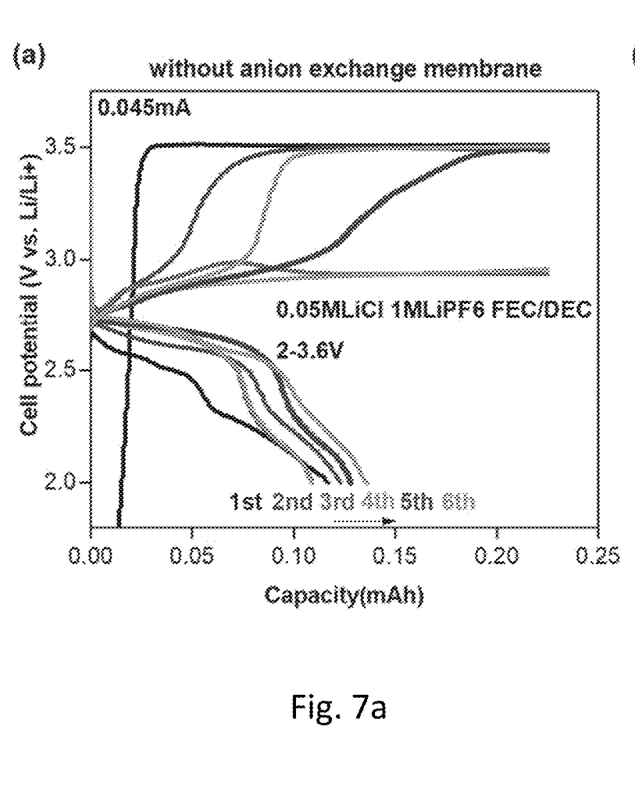
FIG. 7a is a plot showing the charge-discharge curves of Cu at 0.045 mA without anion exchange membrane.
Figure 7B:
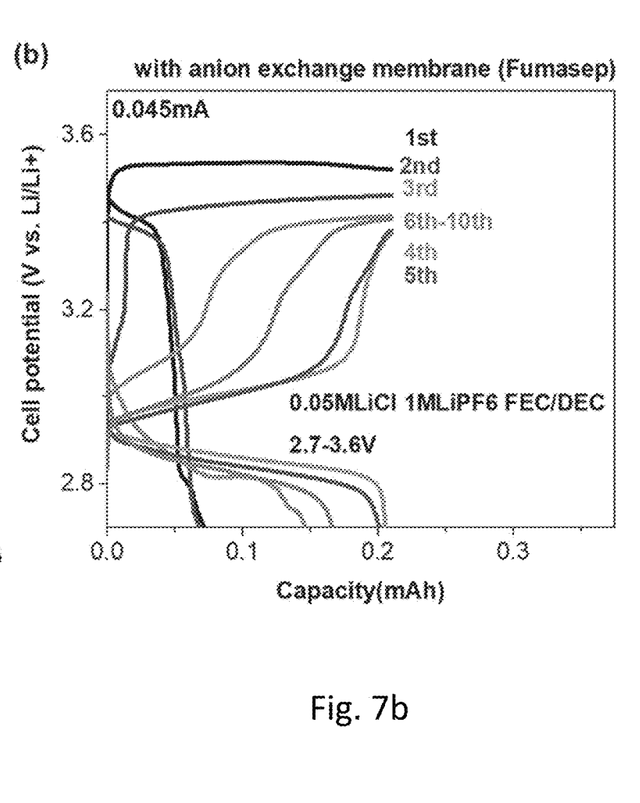
FIG. 7b is a plot showing the charge-discharge curves of Cu at 0.045 mA with anion exchange membrane.

For instance, subject to a charging limitation of 5 hr, Cu may be charged and discharged with the presence of Cl$^-$ in electrolyte 300. As shown in FIGS. 7a to 7b, the battery system 100 may provide better voltage profiles with the presence of the anion exchange membrane 200 than the voltage profiles without the presence of the anion exchange membrane 200. Advantageously, the anion exchange membrane 200 can improve the discharge plateau and the columbic efficiency dramatically.

Figure 8:
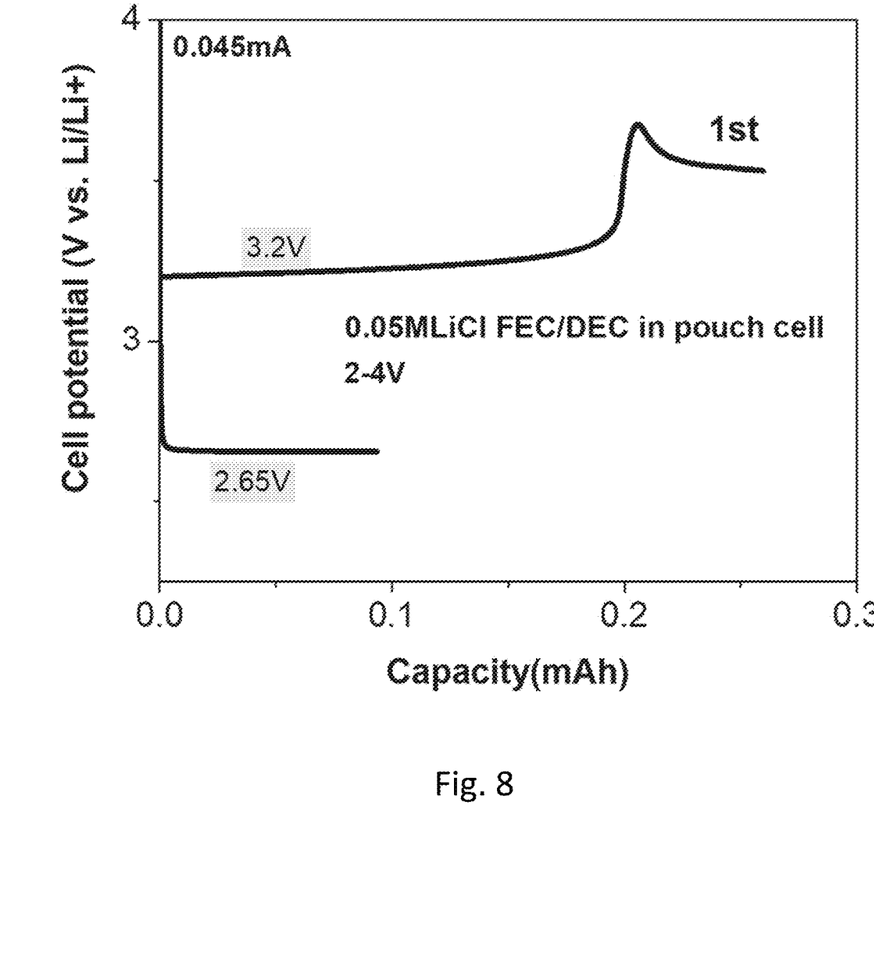
FIG. 8 is a plot showing the charge-discharge curves of Ni at 0.045 mA.

In yet another example embodiment of the battery system 100, Ni may be used as cathode 110 in pouch cells with 0.05M LiCl 1MLiPF$_6$ FEC/DEC as electrolyte 300 and Li metal as counter electrode 120. The battery system 100 may be charged and discharged with an excellent voltage profile as shown in FIG. 8.

In the present invention, the theoretical capacity of the reaction, taking for example Ag or Fe as the electrode material, is 248 mAh g$^{-1}$ and 959 mAh g$^{-1}$, respectively. This is much larger than the capacity that can be obtained from commercial LIB cathode materials such as LiCoO$_2$ and LiMn$_2$O$_4$ that relies on the insertion and extraction of Li from the material. Accordingly, based on the present invention, the inventors may bring a variety of cathode and anode materials into consideration.

Advantageously, the battery technology in the present invention may give a theoretical capacity of close to 1000 mAh g$^{-1}$ with an expected voltage of 2.5 V to 3 V. The theoretical energy density of the battery system is as high as 2375 Wh kg$^{-1}$ with respect to the weight of the cathode material 130.

In a practical full cell, the practical energy density is typically reduced by a half to a third due to the weight of the cell components such as current collector, container, etc. Even if the extra weight of electrolyte 300 is taken into account and increases the total weight of the battery system 100 to 4 to 5 times the weight of the active material 130, the expected practical energy density of the battery system 100 will still be about 500-700 W h kg$^{-1}$. This is more than two times the practical energy density of 250 W h kg$^{-1}$ of commercial LIBs.

Advantageously, the present invention may increase the energy density of batteries per unit mass. It will have long-lasting impacts in many areas such as electronics, transportation, energy supply, etc. as batteries can be made smaller and lighter. For instance, mobile phones, computers and electronic devices can last longer with each charge, electric vehicles can have longer driving distance, and renewable energy systems with battery storage can be made more affordable.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A battery system comprising:
   a positive electrode having a first material arranged to undergo chemical reaction during charging and/or discharging of the battery; wherein the first material includes a metal element selected from a group consisting of the following: Al, Ti, V, Cr, Mn, Fe, Co, Ni, Cu, Zn, Y, Zr, Nb, Mo, Tc, Ru, Ph, Pd, Ag, Cd, Hf, Ta, W, Re, Os, Ir, Pt, Au, In, Sn, Sb, Pb, Bi, and any combination thereof;
   a negative electrode having a second material arranged to undergo chemical reaction during charging and/or discharging of the battery;
   a separator disposed between the positive electrode and the negative electrode; and an electrolyte consisting of an alkali metal salt and at least one of an organic solvent and a room temperature ionic liquid, wherein the organic solvent includes at least one of an ester and a carbonate; and wherein the alkali metal salt includes at least one of Li+, Na+ and K+ as a cation and at least one of Cl−, PF6−, BF4−, ClO4− and TFSI− as an anion, and wherein the anion acts as a charge carrier arranged to facilitate the dissolution of the first material to provide a plurality of metal ions and a plurality of electrons, thereby facilitating the chemical reaction of the first material during charging and/or discharging of the battery.

2. A battery system in accordance with claim 1, wherein the charge carrier is arranged to facilitate chemical reaction of the first material to provide a plurality of electrons.

3. A battery system in accordance with claim 2, wherein the charge carrier is arranged to undergo chemical reaction with the first material to form an insoluble substance and provide a plurality of electrons.

4. A battery system in accordance with claim 3, wherein the insoluble substance comprises metal chloride or metal.

5. A battery system in accordance with claim 1, wherein the organic solvent includes at least one of diethyl carbonate, ethylene carbonate, ethylmethyl carbonate, propylene carbonate, dimethoxyethane (DME) and dimethyl sulfoxide (DMSO).

6. A battery system in accordance with claim 1, wherein the room temperature ionic liquid comprises a Cl-based electrolyte.

7. A battery system in accordance with claim 6, wherein the Cl-based electrolyte includes at least one of 1-Methyl-3-Octylimidazolium chloride ([OMIM][Cl]) and 1-Butyl-3-methylimidazolium chloride ([BMIM]Cl).

8. A battery system in accordance with claim 1, wherein a stored capacity of the positive electrode is inversely proportional to a size of a particle in the first material.

9. A battery system in accordance with claim 1, wherein the first material further includes an alloy form of the metal element and a metal oxychloride.

10. A battery system in accordance with claim 9, wherein the alloy includes at least one of steel and stainless steel.

11. A battery system in accordance with claim 9, wherein the metal oxychloride includes at least one of bismuth oxychloride (BiOCl) and vanadium oxychloride (VOCl).

12. A battery system in accordance with claim 1, wherein the second material comprises an alkali metal.

13. A battery system in accordance with claim 12, wherein the alkali metal includes at least one of Li, Na and K.

14. A battery system in accordance with claim 1, wherein the second material is adapted to provide alkali metal ions.

15. A battery system in accordance with claim 14, wherein the second material includes at least one of graphite, hard carbon, silicon, tin, antimony, bismuth, lead, zinc, and lithium titanate.

16. A battery system in accordance with claim 1, wherein the separator is arranged to reduce shuttling effect.

17. A battery system in accordance with claim 16, wherein the separator comprises an anion exchange membrane.

18. A battery system in accordance with claim 1, wherein the battery comprises an expected voltage between 2.5 V and 3 V and an energy density between 500 Wh kg$^{-1}$ and 700 Wh kg$^{-1}$.

19. A method of forming a battery comprising the steps of:

forming a positive electrode with a first material, wherein the first material is arranged to undergo chemical reaction during charging and/or discharging of the battery; wherein the first material includes a metal element selected from a group consisting of the following: Al, Ti, V, Cr, Mn, Fe, Co, Ni, Cu, Zn, Y, Zr, Nb, Mo, Tc, Ru, Ph, Pd, Ag, Cd, Hf, Ta, W, Re, Os, Ir, Pt, Au, In, Sn, Sb, Pb, Bi, and any combination thereof;

forming a negative electrode with a second material, wherein the second material is arranged to undergo chemical reaction during charging and/or discharging of the battery;

forming a separator between the positive electrode and the negative electrode; and providing an electrolyte consisting of an alkali metal salt and at least one of an organic solvent and a room temperature ionic liquid, wherein the organic solvent includes at least one of an ester and a carbonate; and wherein the alkali metal salt includes at least one of Li+, Na+ and K+ as a cation and at least one of Cl−, PF6−, BF4−, ClO4− and TFSI− as an anion, and wherein the anion acts as a charge carrier arranged to facilitate the dissolution of the first material to provide a plurality of metal ions and a plurality of electrons, thereby facilitating the chemical reaction of the first material during charging and/or discharging of the battery.

\* \* \* \* \*